UNITED STATES PATENT OFFICE.

L. HELD, OF NEW YORK, N. Y., ASSIGNOR TO GEO. P. SCHIFFLIN, OF SAME PLACE.

IMPROVED FIRE-PROOF COMPOSITION FOR CRUCIBLES, &c.

Specification forming part of Letters Patent No. 43,548, dated July 12, 1864.

*To all whom it may concern:*

Be it known that I, L. HELD, of the city, county, and State of New York, have invented a new and Improved Fire-Proof Composition; and I do hereby declare that the following is a full, clear, and exact description thereof, which will enable those skilled in the art to make and use the same.

This invention relates to a composition which is particularly intended for crucibles or other similar articles calculated to sustain a very high temperature.

The invention consists in a mixture of pulverized coal or carbon previously freed, by acids or other suitable agents, from adhering impurities, with clay, exposing said mixture to a bright-red heat, pulverizing the same again, mixing it with a fresh quantity of clay and fresh carbon, and finally forming the composition into the requisite vessels or other articles in such a manner that by the action of the clay the purified carbon, which under ordinary circumstances is combustible, is rendered fire-proof, and by exposing the first mixture of clay and carbon to a bright-red heat a cement is obtained whereby the composition is rendered fire-proof.

The proportion in which I mix the ingredients of my composition together is about as follows: clay, one part; purified carbon, one part. The carbon which I use is obtained from coke, charcoal, or from any animal or vegetable material or materials exposed to a roasting process, or to a high heat in a closed vessel. The carbon thus obtained is essentially different from graphite or black-lead, which is now used in the manufacture of crucibles. This graphite is a mineral substance, and it contains carbon in a crystalline form mixed with some metallic salts. The coal which I use is pure carbon in an amorphous state, and in order to render it fit for my composition I have to free it from all of its adhering impurities. This purpose I effect by treating with muriatic, sulphuric, and nitric acids, or with vegetable acids, if necessary; and by this treatment the alkaline and metallic parts are separated from the carbon. This process is essential for the success of my invention, for if coal should be used which still contains the alkaline or metallic parts, those parts, being set free when the coal is exposed to a high heat, will cause the composition to crack and render it useless for crucibles and similar articles. After the carbon has been purified and pulverized I mix it with the clay in about the proportion above stated. I then expose the mixture to a bright-red heat and pulverize the same again, and by this operation I obtain the cement which renders my composition fire-proof. The pulverized cement I mix again with clay and carbon in about the following proportion: pulverized cement, one part; clay, two parts; carbon, one part, by weight. The mixture thus obtained is fit for use, and crucibles or other articles made from the same are capable to sustain the highest white heat without cracking.

I claim as new and desire to secure by Letters Patent—

1. The use of carbon purified as above described, and mixed with clay in about the proportion herein set forth, and then exposed to a bright-red heat, pulverized substantially in the manner and for the purpose specified.

2. The composition obtained by mixing together the ingredients above specified in about the proportion and substantially in the manner and for the purpose herein set forth.

L. HELD.

Witnesses:
WM. F. MCNAMARA,
M. M. LIVINGSTON.